N. H. Borgfeldt,
Stripping Tobacco.
No. 97,596. Patented Dec. 7, 1869.
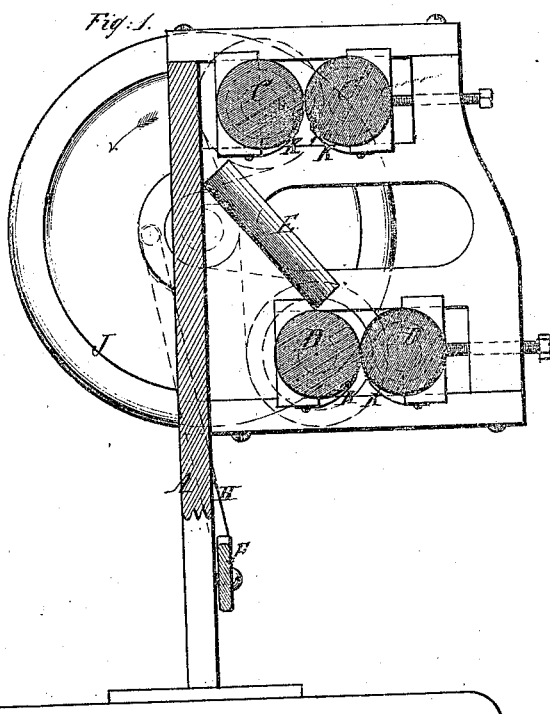
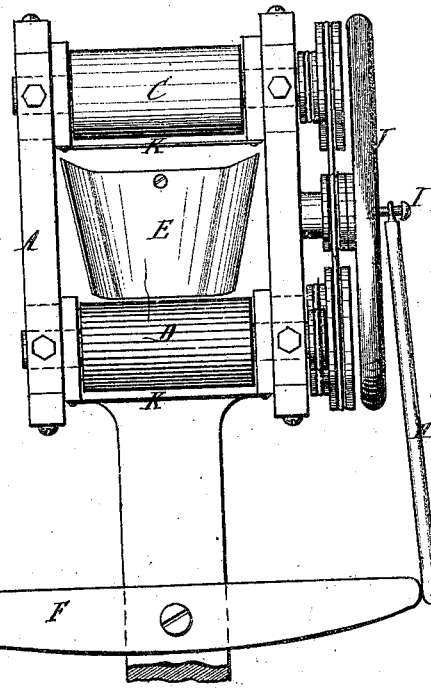
Witnesses
C. Wahlers
E. F. Kastenhuber
Inventor
N. H. Borgfeldt
Van Santvoord & Hauff
Attys

UNITED STATES PATENT OFFICE.

NICHOLAS H. BORGFELDT, OF NEW YORK, N. Y.

MACHINE FOR PREPARING TOBACCO-STEMS.

Specification forming part of Letters Patent No. 97,596, dated December 7, 1869.

*To all whom it may concern:*

Be it known that I, NICHOLAS H. BORGFELDT, of the city, county, and State of New York, have invented a new and Improved Machine for Preparing the Stems of Tobacco-Leaves; and I do hereby declare the following to be a full, clear, and exact description thereof, which will enable those skilled in the art to make and use the same, reference being had to the accompanying drawings, forming part of this specification, in which drawings—

Figure 1 represents a longitudinal vertical section of this invention. Fig. 2 is a front view of the same.

Similar letters indicate corresponding parts.

This invention relates to a machine which is intended particularly for preparing the stems of tobacco-leaves, so that the same can be used as fillers for cigars. Said machine consists of two pairs of rollers, one pair being smooth and made to run at a uniform speed, and the other pair being fluted and made to run at a differential speed, in such a manner that the stems of tobacco-leaves, while passing through the first pair of rollers, are flattened, and by the action of the second pair of rollers, and by the flattened stems are stretched and loosened, and brought in such a condition that the same can be readily torn to the proper length required for a cigar.

In the drawings, the letter A designates a frame, which forms the bearings for two pairs of rollers, C D. The rollers C are smooth, and placed above the rollers D, and they are geared together, either by cog-wheels or other means, in such a manner that they revolve with uniform circumferential velocity. The rollers D are fluted, and they are geared together, so that they revolve with differential velocity, both pairs of rollers being mounted in such a manner that they can be brought as close together as may be desired, to produce the desired effect. Between the upper and lower pairs of rollers is a chute, E, as shown, and the requisite motion is imparted to said rollers by a treadle, F, which connects, by a pitman-rod, H, and eccentric wrist-pin I, with a fly-wheel, J, which is geared together with the rollers C and D, either by cog-wheels or otherwise, cog-wheels being used by preference. Under the rollers C, are scrapers K, which serve to keep the surfaces of said rollers clean.

The stems of tobacco to be prepared are introduced between the upper pair of rollers, whereby the same are flattened out, and the flattened stems are conducted by the chute E between the lower pair of rollers, which, being fluted and running at a differential speed, act like drawing-rollers, stretching the flattened stems, loosening their fibres, and bringing them in such a condition, that the same, while being introduced into a cigar, can be readily torn off to the required length.

If desired, the upper pair of rollers may also be fluted, and run at a differential speed.

By these means, a machine is obtained, which is simple and cheap in its construction, and which can be readily used in any desired place, being so constructed that it can be driven by foot or any other power.

What I claim as new, and desire to secure by Letters Patent, is—

In a machine for preparing the stems of tobacco-leaves, the combination of pressing-rollers C and drawing-rollers D, constructed and operating substantially as set forth.

This specification signed by me, this 20th day of October, 1869.

NICHOLAS H. BORGFELDT.

Witnesses:
W. HAUFF,
E. F. KASTENHUBER.